United States Patent Office 3,427,868
Patented Feb. 18, 1969

3,427,868
ULTRASONIC DEVICE FOR MEASURING THE THICKNESS OF OBJECTS
Roger Charbonnier, Meudon, and Clement Picot, Massy, France, assignors to Societe d'Instrumentation Schlumberger, Paris, France, a corporation of France
Filed Dec. 20, 1965, Ser. No. 515,021
U.S. Cl. 73—67.9
Int. Cl. G01n 9/24
6 Claims

ABSTRACT OF THE DISCLOSURE

An ultrasonic thickness measuring apparatus in which an ultrasonic pulse is transmitted into the test piece and the echoes are used to generate measuring pulses having durations proportional to the time intervals between selected ones of the pulses. The measuring pulses are then multiplied by preselected factors related to the propagation velocity of the material, producing pulses which are still proportional to echo spacing but are significantly longer in duration. One of the elongated pulses activates an oscillator for its duration and a counter counts the oscillations thus produced and digitally displays the result as a measure of thickness. The elongated pulses are also used to check the sequence of events and assure a proper measurement.

Figure 1:
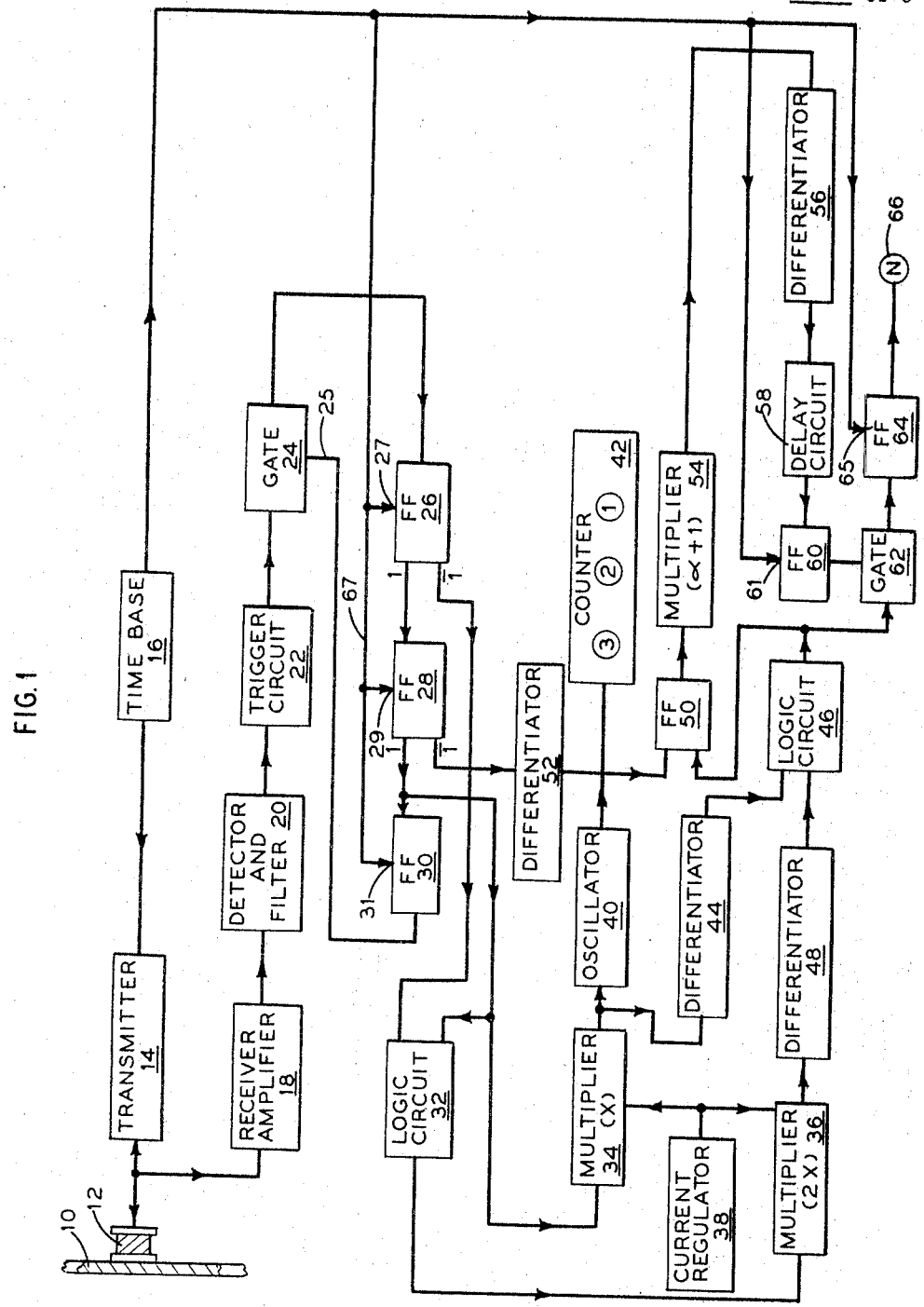

This invention relates to an ultrasonic device for measuring the thickness of objects.

Two main measuring techniques are used in the operation of such a device, resonance and reflection.

The resonance technique has the advantage of enabling thicknesses of less than a millimetre to be measured, but it has, on the other hand, a number of disadvantages. First of all the material, constituting the object for measurement, must not be too absorbent for a resonance phenomenon to be produced between the opposite faces, which faces must, moreover, be sufficiently even and parallel. Since multiple resonance phenomena may occur, particular difficulties of interpretation present themselves, involving a complex operating apparatus, the use of which is often difficult.

The reflection technique is very commonly used, but its use is restricted to the measurement of thicknesses over 2 millimetres. This is due to the difficulty of producing ultrasonic pulses of low amplitude in relation to their transit time through the material. The maximum frequency of acoustic vibrations used is of the order of 15 megacycles and, in this case, the duration of the emitted pulse is 0.5 microsecond approx. The time separating two echoes from successive depths, i.e., two echoes produced by the surface of the object, opposite to that in contact with the transducer, is proportional to the thickness of the object. In the case of steel, a thickness of 1 mm. produces two echoes at an interval of 0.3 microsecond.

It is therefore an object of the invention to provide an improved ultrasonic instrument for the measurement of object thickness in which the disadvantages of the resonance and reflection techniques are minimized.

According to the invention there is provided an ultrasonic device for the measurement of object thickness of a type comprising a piezo-electric transducer, adapted for acoustic contact with the objects to be measured, the said transducer being connected to an emission circuit and a reception circuit, constituted principally of an amplifier and means for selecting two specific back echoes and measuring the time interval between them. These means include a circuit, capable of delivering a measured pulse of duration equal to the said time interval and applying the said pulse to the input of a duration multiplier stage of adjustable multiplication coefficient, the output of which is connected to the input of a chronometer having numerical indicators, the said multiplication coefficient being proportional to the speed of propagation of acoustic waves in the material to be measured.

According to another feature of the invention, the exact value of the coefficient of multiplication relating to the measured pulse, is determined experimentally by means of a preliminary measurement, carried out on a sample of known thickness and of a nature identical to that of the object under study, the said coefficient being adjusted so that the said measurement is represented by the recording of the said thickness on the numerical indicators of the chronometer.

According to still another feature of the invention, the ultrasonic device for measuring the thickness of objects includes, moreover, an efficient-operation indicator, comprising a group of circuits, designed to select three successive back echoes and to deliver a measurement pulse of duration equal to the time interval between the first and third echoes and a control pulse of duration equal to the time interval between the first and second echoes, the said measurement pulse being applied to a first duration multiplication circuit of coefficient equal to X, while the said control pulse is applied to a second duration multiplication circuit of coefficient equal to 2X, the trailing edges of the pulses, delivered by the said multiplication circuits constituting, according to the order of their times of appearance, a first and a second reference pulse. The first echo selected and the first reference pulse are applied to the input of a binary circuit, designed to deliver an output signal of duration equal to the time interval between the said first echo and first pulse, the said binary circuit being followed by a third duration multiplication circuit of coefficient equal to $(\alpha+1)$, the trailing edge of the pulse, delivered by the said third duration multiplication circuit constituting a third reference pulse; the said second and third reference pulses are applied to a logic circuit for the comparison of events, which is designed to deliver an output signal, perceptible by the operator only in the case where the said second reference pulse is subsequent to the said third reference pulse, which corresponds to incorrect function of the device.

According to a complementary characteristic of the efficient-operation indicator of the ultrasonic device according to the invention, the third reference pulse is applied to the input of a delay circuit before being transmitted to the input of the circuit for the comparison of events.

As a result of this arrangement, the operator has continuously at his disposal information on the quality of the measurement effected (this information may be represented by the lighting of a neon tube in the case of incorrect functioning of the device).

The efficient-operation indicator of the device carries out in effect a comparison of the relative durations of the measurement and control pulses, obtained on the basis of three selected back echoes, so as to verify that the duration of the control pulse, within the limits of the coefficient of error, is half that of the measurement pulse. These echoes are, in a first approximation, separated from each other by an equal distance $\Delta t$, but if, in fact, the time separating the first echo from the second is designated $\Delta t$, for a large number of reasons the time, separating the second echo from the third, must be designated $(1+\xi)\Delta t$, $\xi$ being either positive or negative. For a measurement to be regarded as good, the absolute value of $\xi$ must be less than $2\alpha$, which is determined by the circuit for the comparison of events. This establishes whether the two first reference pulses, separated by an interval of time equal to $X.\xi.\Delta t$, does or does not include the third reference pulse, which is separated from the first reference pulse by a time approximately equal to $2X.\alpha.\Delta t$.

Furthermore, since the third reference pulse is subjected to a delay $\tau$ before being transmitted to the circuit for the comparison of events, the said comparison circuit determines in fact whether $\xi.\Delta t < \tau/X + 2\alpha.\Delta t$, i.e., whether the error that may arise during the course of measurement is less than the sum of the absolute error $\tau/X$ and the relative error $2\alpha.\Delta t$.

Figure 2:
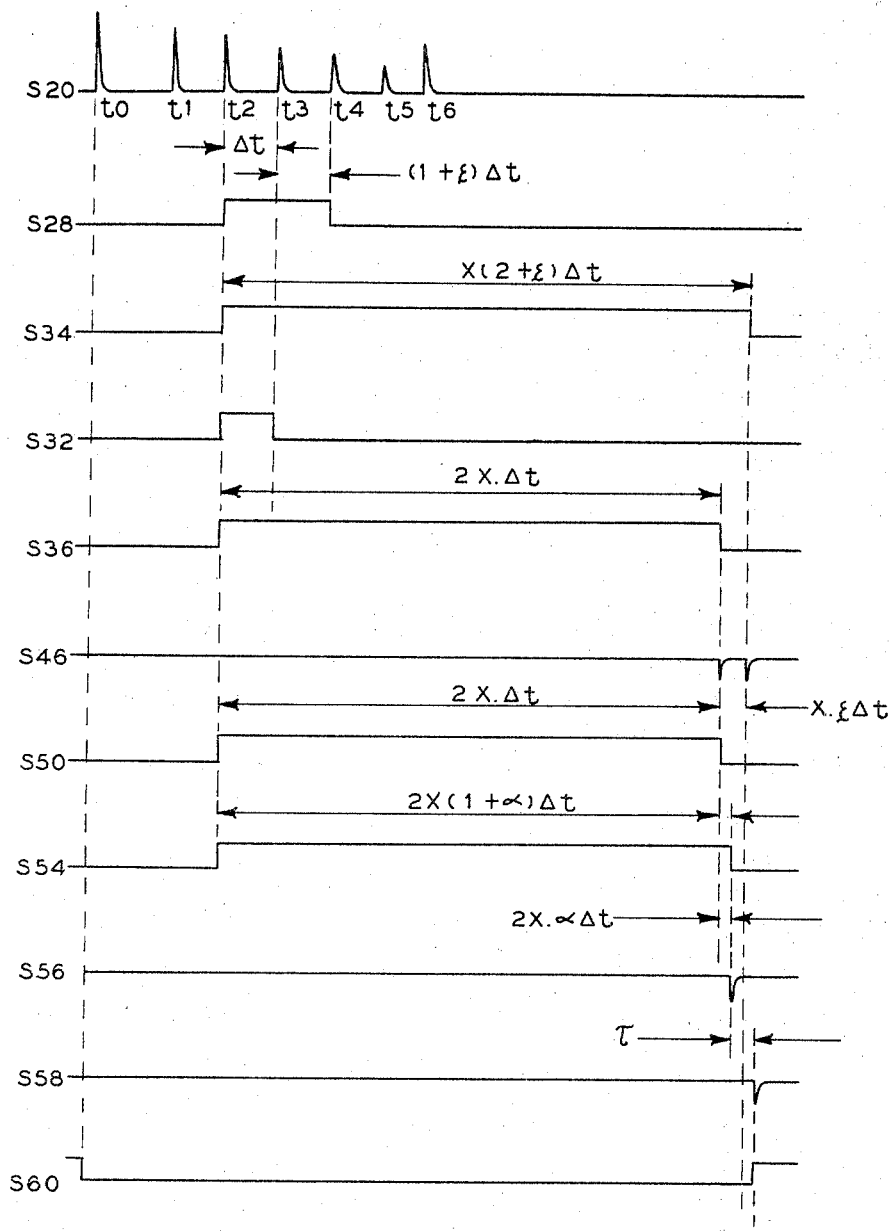
Figure 3:
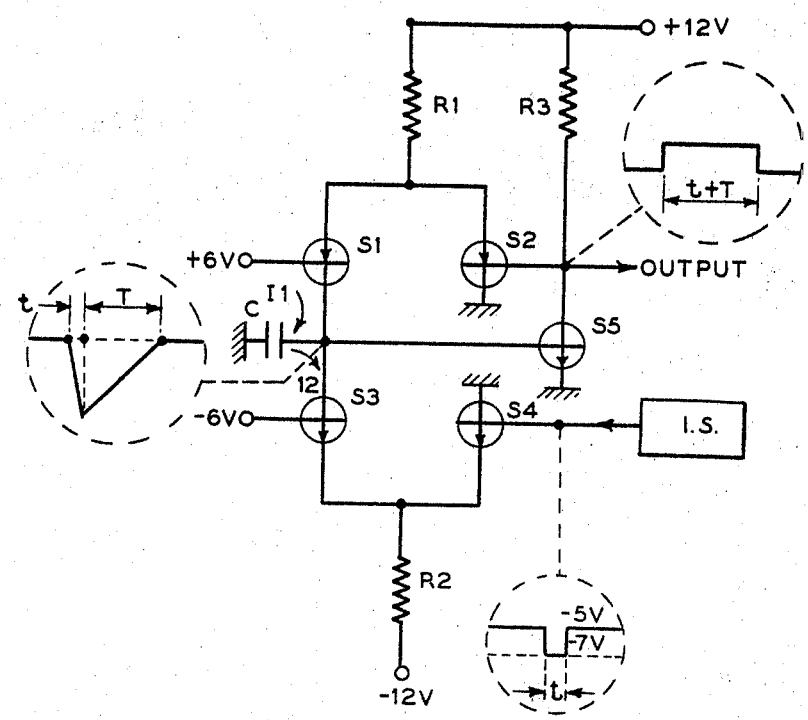

These and other objects, features and advantages of the invention will be best understood from a study of the following detailed description taken in conjunction with the claims and with the drawings in which:

FIGURE 1 represents a schematic block diagram of an embodiment of the invention, FIGURE 2 represents signals appearing at different points in the embodiment shown in FIG. 1, FIGURE 3 represents a multiplication circuit for pulse duration, in accordance with the present invention.

Referring to FIG. 1, a plate 10, the thickness of which it is desired to measure, is in acoustic contact (for example by means of a drop of oil) with a piezo-electric transducer 12. A transmitter 14, operated by a time base 16, is connected to the transducer 12, and also to the input of a receiver amplifier 18, followed by a detection and filter circuit 20 and a trigger circuit 22. Connected to trigger circuit 22 is gate 24 which has a command electrode 25 for the purpose of closing the gate and an output connected to the input of a series of three bistable flip flops 26, 28 and 30, each having a zero-return electrode (27, 29, 31), connected to the output of the time base 16 via line 67. The output $\bar{1}$ of the flip flop 26 and the output 1 ($S_{28}$ in FIG. 2) of the flip flop 28 are both applied to the input of an AND logic circuit 32. The output 1 of the flip flop 30 is connected to the electrode 25 of the gate 24. The output 1 of flip flop 28 is also connected to the input of flip flop and to the input of a pulse duration multiplication circuit 34 of the type described in FIG. 3 below. The coefficient X of the pulse duration multiplication circuit 34 may vary between 25 and 75 approximately.

The output $S_{32}$ (FIG. 2) of the circuit 32 is applied to another pulse duration multiplication circuit 36, which has a coefficient of multiplication equal to 2X. The circuits 34 and 36 are connected to the output of the same current regulator device 38, the variation in the said current being the determining factor for the parameter X, which is reflected in the pulse duration multiplication coefficients of circuits 34 and 36. The output of circuit 34 is applied to the input of an oscillator 40, which is connected to a three-figure decimal counter 42. In the particular case of FIG. 1, the decimal counter 42 is designed to record, to the nearest 0.1 mm., thicknesses up to 99.9 mm.

The output signals $S_{34}$ and $S_{36}$ (FIG. 2) of the multiplication circuits 34 and 36 are applied respectively to differentiating circuits 44 and 48, which are designed to deliver a negative pulse at the moment of appearance of the trailing edges of the square wave signals, produced by the multiplication circuits 34 and 36. The output pulses of the differentiating circuits 44 and 48 are applied to the input of an OR logic circuit 46, the output of which is connected to the electrode controlling the return to the passive state of a bistable flip flop 50, the electrode controlling the activation of flip flop 50 being connected across a differentiating circuit 52, identical with circuits 44 and 48, to the output $\bar{1}$ of the flip flop 28. The pulse $S_{50}$ (FIG. 2), delivered by the bistable flip flop 50, is applied to a third pulse duration multiplication stage, the multiplication coefficient of which is equal to $(\alpha+1)$, the coefficient $\alpha$ being equal for example to 0.01. The output $S_{54}$ (FIG. 2) of the stage 54 is applied to a differentiating circuit 56, identical with 44, which delivers a pulse $S_{56}$ and is conducted to a delay circuit 58, which introduces a delay of one microsecond. The output $S_{58}$ of the delay circuit 58 is applied to the activating input of a bistable flip flop 60, of which the input 61, governing the return to the passive state, is connected to the time base 16. The output of the flip flop 60 is applied to the command electrode for the opening of a gate 62, the input is connected to the output of the OR logic circuit 46. The output of the gate 62 is applied to the activating input of a bistable flip flop 64, comprising an input 65, governing the return to the passive state, connected to the output of the time base 16. The bistable flip flop 64 is designed, when activated, to light a neon tube 66.

The time base circuit 16 delivers clock pulses to transmitter 14, the frequency of which is several tens of cycles per second. Each time a clock pulse is received, transmitter 14 applies to the piezo-electric transducer 12 an exciting pulse, the duration of which is about one microsecond. Following this activation, the piezo-electric transducer 12 oscillates at its own resonant frequency (selected between 5 and 15 megacycles as an inverse function of the thickness to be measured). The transducer 12 is generally fitted with a damper of heterogeneous material, for example, a dense powder immersed in thermosetting plastic so that its free oscillations last a few cycles at the most.

A short acoustic pulse is applied to the plate 10 in response to the application of the exciting pulse from the transmitter 14, and a series of echoes (surface and back echo) are then received by the transducer 12 and transmitted to the receiver amplifier 18. After detection and filtering by the stage 20, a signal $S_{20}$, shown on FIG. 2, is obtained, $t_0$ being the emission pulse, $t_1$ a surface echo, $t_2$ to $t_5$ a series of back echoes, and $t_6$ a further surface echo. Since only the deep echoes are of interest for thickness measurements, the echo $t_1$ can be disregarded.

At the moment of emission, the time base 16 delivers to the flip flops 26, 28 and 30 via line 67 a return-to-zero pulse, which has the effect of placing the said flip flops in a passive state. Under these conditions the gate 24, which is closed while the flip flop 30 is in an active state, is open.

The assembly of flip flops 26, 28 and 30 constitute a binary division stage. The first pulse applied to the said stage is the pulse $t_1$, since, in synchronization with the pulse $t_0$, the flip flops 26, 28 and 30 were returned to the passive state by the pulse from time base 16. The flip flop 26 presents at the output designated as 1, an active state during the periods, separating the pulses $t_1$-$t_2$ on the one hand and $t_3$-$t_4$ on the other. The output 1 of the flip flop 28 is under these conditions in an active state during the time separating the pulses $t_2$ and $t_4$. The signal $S_{28}$ (FIG. 2) illustrates this state.

At the output of the logic circuit 32, which receives the output 1 of the flip flop 28 and the output $\bar{1}$ of the flip-flop 26, there appears the pulse $S_{32}$, the duration of which is equal to the time separating the pulses $t_2$ and $t_3$. When the pulse $t_4$ is applied to the flip flops 26, 28 and 30, the flip flops 26 and 28 are returned to the passive state, whereas the flip flop 30 passes over to the active state, thus causing the closing of the gate 24 via command electrode 25. Under these conditions the different echoes, received by the transducer 12 after the echo $t_4$, are not transmitted to the calculation circuits.

The time interval between echoes $t_3$ and $t_2$ is designated $\Delta t$ and that between echoes $t_4$ and $t_3$ $(1+\xi)\Delta t$. As a result, the signal $S_{28}$ has a duration $(2+\xi)\Delta t$ and $S_{32}$ a duration $\Delta t$. The signals $S_{28}$ and $S_{32}$ are then applied respectively to the pulse duration multiplication circuits 34 and 36.

According to a particular characteristic of the invention, a pulse duration multiplication circuit is characterized by the fact that it includes a capacitor designed to be charged, during a time duration designated as $t$, by the difference ($I_1-I_2$) between two currents $I_1$ and $I_2$, then discharged by the current $I_1$ alone during a time T, until it regains its initial potential. The total time required for the said capacitor to be charged to a potential different from its initial potential is determined by an amplitude comparison circuit having a binary output pulse the duration of which is equal to $I_2t/I_1$. By means of a circuit of this type, the duration of the pulse $t$ can be multiplied by a large coefficient, e.g., 100 or 200.

A suitable multiplication circuit will now be described. Referring to FIG. 3, $S_1$ is a pnp transistor, the base of which is connected to a +6 v. source of potential and the emitter of which connected to a resistance $R_1$, which in turn is connected to a +12 v. source. One terminal of a capacitor C is connected to the collector of the transistor $S_1$ and the other terminal is connected to ground. The emitter of the transistor $S_1$ is also connected to the emitter of a transistor $S_2$, identical with $S_1$. The collector of transistor $S_2$ is connected to ground.

The condenser C is also connected to the collector of an npn transistor $S_3$, the base of which is connected to a source of −6 v. and the emitter of which is connected to a resistance $R_2$, fed from a source of −12 v. The emitter of the transistor $S_3$ is also connected to the emitter of a transistor $S_4$, identical with $S_3$, the collector of which is connected to ground. The base of the transistor $S_4$ is fed from a input pulse source designated I.S. which applies thereto a steady state or base potential of −5 volts and input pulses of −7 volts amplitude.

The capacitor C is, on the other side, connected to the base of an npn transistor $S_5$, the emitter of which is connected to ground and the collector connected to the base of the transistor $S_2$ and to a resistance $R_3$, which is also connected to the −12 v. source. The output pulse of the calculation circuit is picked up on the collector of the transistor $S_5$.

In the absence of an input pulse on the base of the transistor $S_4$, the −5 v. voltage applied to this base places the transistor $S_4$ in a state of conduction. A voltage, approximately equal to −5 v., appears on the $S_4$ emitter, which has the effect of blocking the npn transistor $S_3$, the base of which is at −6 v.

A voltage feedback loop comprising the transistors $S_1$, $S_2$, $S_5$ and the capacitor C has the effect of creating at the terminals of the capacitor C a quiescent voltage, slightly higher than the deblocking voltage of the transistor $S_5$. The transistor $S_1$ provides the base current necessary for the functioning of the transistor $S_5$. It will be noted that if the current across $R_1$ varies for any reason, the quiescent voltage of the capacitor C and the base current of the transistor $S_5$ which crosses $S_1$, will be very little modified thereby, whereas the transistor $S_2$ will absorb almost the total amount of this variation.

When the input pulse source applies to the base of the transistor $S_4$ a pulse of duration $t$, similar to that shown in FIG. 3, the transistor $S_4$ becomes blocked while the transistor $S_3$ becomes conductive. Since the transistor $S_3$ functions on a common base, a current $I_2$, the magnitude of which is determined by the resistance $R_2$ and the two voltage sources feeding the transistor, flows through the capacitor C and the transistor $S_3$. The voltage at the terminals of the capacitor C falls immediately. This variation is amplified by the transistor $S_5$ and the transistor $S_2$, which rapidly has the effect of placing the transistor $S_2$ in a blocked state and, on the other hand of causing a current $I_1$, determined by the resistance $R_1$ and the two sources of feed for the transistor, to flow across the transistor $S_1$, mounted on the common base. During the duration of the pulse $t$, a current $I_1-I_2$ then charges the capacitor C.

In the particular case of the embodiment described, it is essential that $I_2$ should be larger than $I_1$. As a result the voltage at the terminals of the capacitor C decreases in linear fashion, as shown in FIG. 3.

At the end of the pulse $t$, the capacitor C has undergone a variation of charge $Q-Q_0=(I_2-I_1)t$. As soon as the pulse $t$ disappears, the transistor $S_4$ immediately returns to the open state, whereas the transistor $S_3$ becomes blocked and $S_5$ and $S_2$ remain blocked. Under these conditions only the current $I_1$ continues to feed the capacitor C.

The voltage at the terminals of the capacitor C increases, therefore, in linear fashion until the said voltage again reaches the deblocking threshold for the transistor $S_5$. At this exact moment the transistor $S_5$ starts to conduct again and a rapidly increasing current flows through the resistance $R_3$. This has the effect of bringing the transistor $S_2$ into a conductive state and of shunting across the said transistor $S_2$ almost the complete current $I_1$, so as to leave only the current necessary for the feed to the base of the transistor $S_5$ passing across the transistor $S_1$. At this precise moment, therefore, the circuit is returned to its condition prior to the application of the pulse of duration $t$.

The time T, required by the capacitor C to lose the charge $(Q-Q_0)$, acquired during the pulse of duration $t$, and to return to its initial state, is defined as $I_1 \cdot T = Q - Q_0$. These expressions immediately give us $T/t = I_2/I_1 - 1$. Since the feed voltages of the transistors $S_1$ and $S_3$ are equal in absolute value, $T/t = (R_1/R_2) - 1$. The pulse appearing on the collector of the transistor $S_5$ is of equal duration as the blocking of the said transistor, i.e., $(t+T)$ or $(R_1/R_2)t$.

The device according to the invention constitutes, therefore, a pulse duration multiplication circuit, providing an output pulse having a duration proportional to the command pulse $t$, the coefficient of proportionality being, in the particular case of the embodiment described, equal to the ratio between the resistances $R_1/R_2$. Since $R_1$ may be very large in relation to $R_2$, the pulse duration multiplication circuit in this form may have a multiplication coefficient of the order of several hundreds.

In an ultrasonic device for the measurement of the thickness of objects, the advantage of the pulse duration multiplication circuit 34 is that it permits the use of a low-performance (and therefore not too cumbersome) counter such as the counter 42 for the measurement of the duration of the pulse $S_{28}$, which may, in the case of small thickness values, be of the order of tens of nanoseconds.

In the particular case of the multiplication circuits 34 and 36, used in the device according to the invention, the currents designated as $I'_2$ and $I''_2$, which charge the capacitors of circuits 34 and 36 (equivalent to capacitor C of FIG. 3), have a constant value with $I'_2 = I''_2$, whereas the currents designated as $I'_1$ and $I''_1$, which discharge the said capacitors, are variable and $I'_1 = I''_1$. It may be seen, therefore, that by means of a single current regulator device 38 it is possible to vary permanently the current $I_1$ and to produce for the multiplication coefficients of circuits 34 and 36 values equal respectively to X and 2X, with X varying between 25 and 75, as has been described above.

In practice the resistances $R_1$ are each composed of one resistance and one transistor, the said resistances and the said transistors being arranged in pairs, while the bases of the said transistors are fed from the same current-regulating potentiometer.

If the coefficient X of the multiplication stage 34 is given a value proportional to the speed of propagation of acoustic compression waves (the only type to be taken into consideration in general, since the transducer and measurement object are normally coupled by means of an intermediate liquid) in the material of which the plate 10 is composed, there may be obtained at the output of the said stage 34 a pulse of duration proportional to the thickness alone of the said plate. The oscillator 40, to which is applied the pulse $S_{34}$ then delivers to the counter 42 a number of pulses exactly proportional to the thickness, required to be measured. Using a sample of exactly-known thickness and of identical type to the plate 10, it is easy by operation of the current control potentiometer 38 to vary the coefficient X until the said thickness is recorded on the counter 42. Measurement of the thickness of the plate 10 can then be effected immediately.

The trailing edges of the signals delivered by the multiplication stages 34 and 36, which have respective durations $X(2+\xi)\Delta t$ and $2X.\Delta t$, are differentiated by differentiating circuits 44 and 48 to generate reference pulses $S_{46}$, (FIG. 2), appearing at the output thereof. Under these conditions the pulses $S_{46}$ are separated by a time interval $X.\xi.\Delta t$.

The flip flop unit 50, which shifts to the active state instantaneously on the appearance of the first back echo $t_2$, returns to the passive state instantaneously on the appearance of the first reference pulse, provided by the logic circuit 46. The duration of each of the output pulses from flip flop unit 50, designated as $S_{50}$, is therefore, either $2X.\Delta t$ or $(2-\xi)X.\Delta t$ according to the polarity of the coefficient of measurement error. In fact, the signal $S_{50}$ is the shortest of the signals $S_{34}$ and $S_{36}$, thus enabling the comparison of events circuits comprising the circuits 60 to 64, to disregard the sign of the said coefficient ϵ.

The pulse $S_{50}$ is applied to the pulse duration multiplication stage 54, the coefficient of multiplication of which is equal to $(1+\alpha)$ with $\alpha=0.01$ in the case of the present example. The signal $S_{54}$ has a leading edge synchronous with the leading edge of the signal $S_{50}$, but its duration is $2\alpha.X.\Delta t$ longer than that of the said signal $S_{50}$. The trailing edge of the signal $S_{54}$ appears at the output of the differentiating circuit 56 in the form of a pulse $S_{56}$, which constitutes the third reference pulse.

The multiplication circuit 54 differs slightly from the circuits 34 and 36, described in relation to FIG. 3. In the case of circuit 54, in fact, it is desired that the duration of the output pulse $S_{54}$ thereof should be appreciably greater than 1% of that of the input pulse $S_{50}$. It is then simpler during the input pulse $S_{50}$ to charge capacitor C of multiplication circuit 54 with a single current of well-defined value I and then to discharge capacitor C with another single current of value 100 I. The modification, which must in this case be made to the device, described in relation to FIG. 3, is to connect the base of the transistor $S_1$ to a blocking circuit comprising a transistor which receives the input pulse and is designed to bring the transistor $S_1$ into a state of non-conduction throughout the entire time duration $t$. In general such a modification should be introduced when it is desired to have a coefficient of multiplication equal to $(m+1)$, the term $m$ being equally well either very small (but not zero) or very large.

Reverting to FIG. 1, the third reference pulse $S_{56}$ is only applied to the input of the flip flop 60 after a predetermined delay, $\tau$, the value of which in the present case is 1 microsecond which corresponds, after multiplication by a factor of the order of 70, to the transit time in 0.1 mm. of steel. As a result, the flip flop $S_{60}$, which is brought to a passive state by the return-to-zero pulse delivered by the time base 16 at the moment $t_0$ transmission, is activated instantaneously by the appearance of the pulse $S_{58}$, furnished by the delay circuit 58.

Under these conditions, the gate 62 is in the closed position at the precise moment of appearance of the second reference pulse $S_{46}$. Accordingly, in the particular case of the cycle of signals represented in FIG. 2, the flip flop 64 remains in the passive state and the neon tube does not light, thus indicating that the measurement is correct.

On the other hand, if during the course of a cycle the second reference pulse $S_{46}$ appears after the pulse $S_{58}$, it will be transmitted by the gate 62 to the flip flop 64, which will cause the neon tube to light until the next cycle. This signifies that the measurement, carried out during the particular cycle, is not good and that the operator should modify the connection between transducer and object so as to improve the acoustic contact and to prevent parasitic echoes interfering with the measurement. The safety indicator, linked with the thickness measuring instrument, constitutes therefore a logical comparison device, which shows that the measurement is good (and the neon tube 66 "out") provided that $/X.\xi.\Delta t/ < 2\alpha.X.\Delta t + \tau$ i.e., provided that $/\xi.\Delta t/ < 2\alpha.\Delta t + \tau/X$ or again provided that the error $\xi.\Delta t$ on the position of the third echo, used for the measurement, is not greater than the sum of a relative error $2\alpha.\Delta t$ and an absolute error $\tau/X$.

The invention is, of course, not restricted to the embodiment described above, but may on the contrary be the subject of numerous variations.

It is, for example, possible to select echoes $t_2$, $t_3$ and $t_5$ instead of echoes $t_2$, $t_3$ and $t_4$. Under these conditions, the duration of the measurement pulse, the leading and trailing edges of which are $t_2$ and $t_5$ respectively, would be $(3+\xi)\Delta t$, the duration of the control pulse remaining unchanged. One would then use pulse duration multiplication circuits, the coefficients of which would be X and 3X, in such a way that the lag between the first and second reference pulses $S_{46}$ would always remain $\xi.X.\Delta t$. It is to be noted, however, that this solution involves the disadvantage of needing a transmission power greater than in the case of FIG. 1 and/or more complex receiver amplifiers and filters. In general, therefore, the form of embodiment in FIG. 1 is to be preferred.

Furthermore, instead of taking the echoes $t_2$ and $t_3$ as defining the leading and trailing edges of the control pulse, $t_3$ and $t_4$ may be taken. This would be effected by applying to one of the inputs of the AND circuit 32 the output 1 of the rocker 26 instead of the output Ī. One would then have as a duration for the control pulse $(1+\xi)\Delta t$. In this case pulse duration multiplication coefficients of $(X+1)$ and $(2X+1)$ would be given for circuits 34 and 36, in such a way that the trailing edges of the pulses, delivered by the said multiplication circuits would always be subject to a time lag of $X.\xi.\Delta t$, i.e., that the time interval between the two first reference pulses would be directly proportional to the coefficient of measurement error $\xi$.

In this case the multiplication circuits used would be similar to circuit 54 in FIG. 1, i.e., conforming in type to the variant described above in relation to FIG. 3. For reasons of simplicity, therefore, the embodiment described in relation to FIG. 1 is to be preferred.

After the description of the two variants given above, it can be seen that, in an efficient operation indicator, the means for delivering the two first reference pulses may in general comprise a group of circuits, designed to select three specific back echoes and generate on the basis of these three echoes a measurement and control pulse one of the said pulses having, within the limits of the coefficient of measurement error, a duration equal to a complete multiple of the duration of the other, the said measurement and control pulses being applied respectively to a first and second duration multiplication circuit, the multiplication coefficients of which are in such ratio to each other that the trailing edges of the pulses, delivered by the said multiplication circuits, are displaced in relation to each other by a period equal to the product of the time interval between two successive echoes, multiplied by the said coefficient of error and the lesser of the said coefficients of multiplication, the said edges constituting, in the order of their time of appearance, the said first and second reference pulses.

Since many changes could be made in the above construction and many apparently widely-different embodiments of this invention could be made without departing from the scope thereof, it is intended that all matter contained in the above description or shown in the accompanying drawings shall be interpreted as illustrative and not in a limiting sense.

We claim:

1. Ultrasonic apparatus for measuring the thickness of objects comprising: means for generating discrete pulses of acoustic wave energy, means acoustically coupled to said generating means for applying said pulses to an object whose thickness is to be measured, means for detecting successive echoes of a selected one of said pulses reflected from said object, means coupled to said detecting means for generating a measuring pulse representative of the time interval between two of said echoes, a pulse duration multiplication unit having means for adjusting the coefficient of multiplication thereof to a value representative of the speed of propagation of acoustic wave energy in said material, means coupled to said measuring pulse generating means for applying said measuring pulse to said multiplication unit, an oscillator responsive to the output of said multiplication unit to generate a series of oscillations for the duration of said output; and counter means connected to said oscillator for counting oscillations produced thereby and for providing a digital indication of the thickness of the object being measured.

2. The invention defined in claim 1, wherein said measuring pulse has a time duration equal to the time interval between first and third ones of said successive echoes, and including means coupled to said detecting means for generating a control pulse having a duration equal to the time interval between first and second ones of said echoes, said pulse duration multiplication unit having a coefficient X and further including a second pulse duration multiplication unit having a coefficient equal to 2X, means for applying said control pulse to said second pulse duration multiplication unit, each of said multiplication units having first and second output pulses, representative of said measuring pulse and said control pulse, respectively, the trailing edges of said first and second output pulses forming first and second reference pulses, a binary circuit, means for applying the first selected echo and the first reference pulse to the input of said binary circuit, said binary circuit having an output signal of duration equal to the time interval between said first echo and first reference pulse, a third pulse duration multiplication circuit having a selected coefficient and connected to said binary circuit and having a pulse output representative of said binary output signal, the trailing edge of which constitutes a third reference pulse, a logic circuit for the comparison of events, means for applying said second and third reference pulses to said logic circuit, said logic circuit being operative to deliver an output signal perceptible by the operator only in the event that said second reference pulse is later than said third reference pulse, which corresponds to unsatisfactory functioning of the apparatus.

3. The invention defined in claim 2, in which the measurement pulse has a duration equal to the time interval between the first and third echoes and a control pulse of duration equal to the time interval between the second and third echoes, said first pulse duration multiplication circuit having a coefficient designated $(X+1)$, and said second pulse duration multiplication circuit having a coefficient designated $(2X+1)$, the trailing edges of the pulses delivered by the said multiplication circuits forming according to the order of their times of appearance, said first and second reference pulses.

4. An apparatus for measuring thickness comprising the combination of means for generating a pulse of acoustic wave energy, means for coupling said pulse into a test object, means for receiving echoes from within said object resulting from said pulse, means connected to said receiving means for generating a measuring pulse representative of the time interval between two of said echoes, means for accepting said measuring pulse and for producing a gate pulse having a duration which is significantly greater than said measuring pulse, said gate pulse duration being related to said measuring pulse duration by a preselected multiplication factor representative of the material of said test object, counter means for counting pulses applied thereto and for displaying in digital form the total count, and means responsive to said gate pulse for providing a series of pulses of known frequency to said counter only during the interval cocupied by said gate pulse, the total count attained by said counter during the interval being a measure of thickness of said test object.

5. Apparatus according to claim 4 wherein said means for generating a measuring pulse comprises gate circuit means for normally allowing echo pulses to pass, a binary counter for producing a first output signal at the first echo, a second output signal at a preselected later echo, and a third output signal, said second signal being connected to close said gate, said first signal constituting a measuring pulse having a duration representative of the time spacing between two of said echoes.

6. Apparatus according to claim 5 wherein said third signal constitutes a pulse having a duration representative of the time spacing between two of said echoes at least one of which is different from an echo forming a boundary for said first signal.

References Cited

UNITED STATES PATENTS

| | | | |
|---|---|---|---|
| 2,888,824 | 6/1959 | Henry | 73—67.9 |
| 3,169,393 | 2/1965 | Stebbins | 73—67.9 |
| 3,339,403 | 9/1967 | Barnes | 73—67.9 |
| 3,354,700 | 10/1967 | Schindler | 73—67.9 |

JAMES J. GILL, *Primary Examiner.*

JOHN P. BEAUCHAMP, *Assistant Examiner.*